Oct. 19, 1954     A. W. HOGAN     2,692,300
ELECTRIC IMAGE FORMATION AND CONTROL APPARATUS
Filed July 6, 1950     2 Sheets-Sheet 1

Inventor
A. W. HOGAN

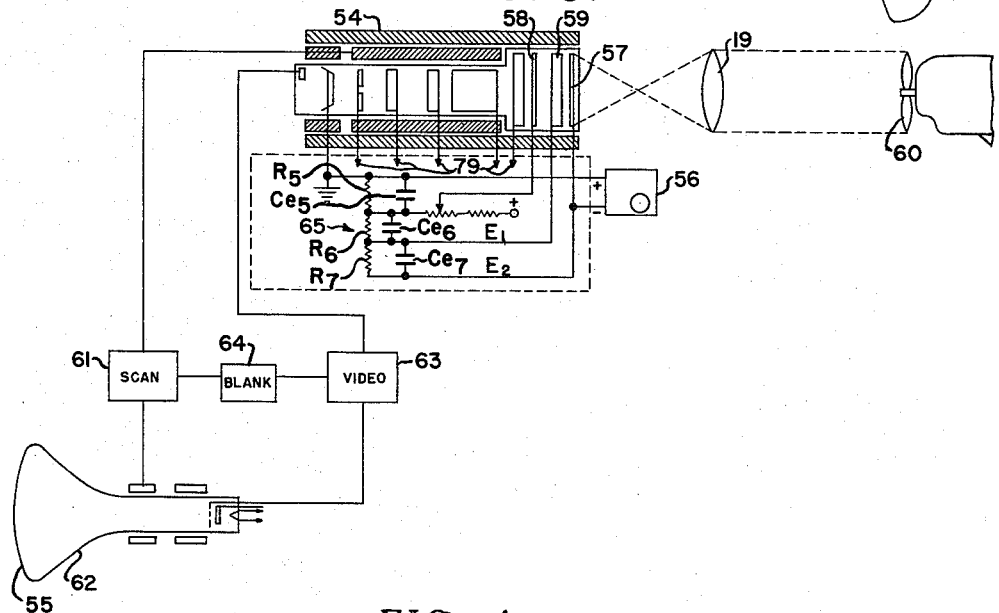
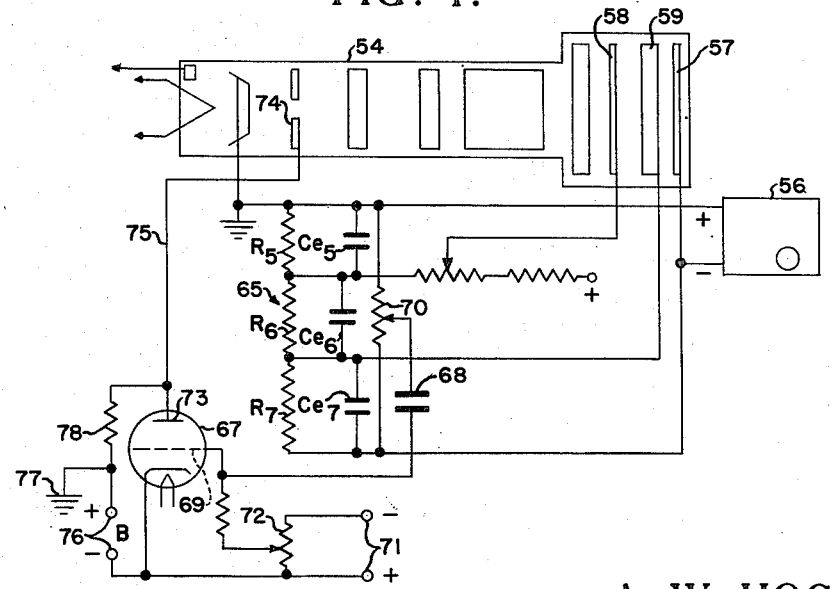

Patented Oct. 19, 1954

2,692,300

UNITED STATES PATENT OFFICE 2,692,300

ELECTRIC IMAGE FORMATION AND CONTROL APPARATUS

Alsede W. Hogan, Berwyn, Md.

Application July 6, 1950, Serial No. 172,370

3 Claims. (Cl. 178—6.8)

(Granted under Title 35, U. S. Code (1952), sec. 266)

This invention relates to electronic image formation and control and more particularly to control circuits wherein devices which are capable of forming an electron image in response to an optical image can be controlled to produce high speed electronic shutter effects, thereby to utilize the instantaneous electron image so formed to produce a desired visible image either during a single or series of control periods.

The image photo-tube is well known as a device which will produce a visible image on its fluorescent screen which corresponds to the optical image focused on its photo-cathode when proper operating voltages are applied to the tube electrodes. The circuit of the present invention provides for application of controlled duration operative voltages to the electrodes of such a tube for the purpose of producing a visible image on the fluorescent screen which corresponds to the optical image focused on the photo-cathode during the application of the operative voltages. By making the duration of the application of the operative voltages sufficiently short such, for example, as of the order of one microsecond, any motion of the object which provides the optical image on the photo-cathode will not be apparent in the visual image that appears on the fluorescent screen. Such a device is well suited to act as a shutter for a camera, either for a single exposure upon the application of operative voltages once or for repeated exposures of the intermittent motion picture type wherein the operative voltages for the electronic shutter are applied successively, once each frame, for example. Such a device is also well suited to act as a stroboscope in which case the repetition rate of application of operative voltages is controlled.

The image orthicon is well known as a device which can be used to modulate an electric current in accordance with the intensity of light at a given point of an optical image as an electron beam sweeps the target energized in accordance with the optical image. Energization of the target occurs only when the accelerator electrode is supplied with the proper voltage. The present invention provides means for supplying this voltage for a controlled period of time thereby making the energization of the target correspond to the optical image as it appears during the application of the control voltage to the accelerator electrode. This image information on the target can be converted into a modulated voltage or current by conventional scanning means and then converted to a visible image by conventional television receiver means to complete the system of the present invention.

The scanning of the target and receiver means may be conventional and employ the standard sweep rates or other convenient rates even when the control voltage is applied to the accelerator electrode for a very short period of time because the target, when energized, retains the image formed thereon for a considerable period of time due to its persistence characteristic. Such a device can be used as a photographic shutter to obtain exposures as short as desired by controlling the length of time operative voltage is applied to the accelerator electrode. This embodiment has the additional advantage that the camera or viewing location can be remote from the event under observation since means for transmitting the signals from an image orthicon to a distant television receiver are well known in the art. This embodiment is also useful as a stroboscope to produce a stationary image of a rotating object by adjusting the repetition rate of the voltage pulses supplied to the accelerator electrode into synchronism with the recurring condition of the object.

It is an object of this invention to provide improved control circuits for electron image devices.

Another object is to provide means for controlling the transition of the electron image of such a device.

A further object is to provide means whereby an electron image device can be utilized as a light shutter having an extremely wide range of operating speeds.

A further object is to provide means whereby an electron image device can be utilized as a stroboscope.

An additional object is to provide a system for accurately synchronizing an electron image device shutter with the recurring condition of the object being photographed or observed.

Another object is to provide means for high speed photography at high ambient light levels.

Still another object resides in the provision of an absolutely noiseless shutter.

Other objects and many of the attendant advantages of this invention will be readily appreciated as the same becomes better understood by reference to the following detailed description when considered in connection with the accompanying drawings wherein:

Fig. 3 is a view of the electronic shutter control system of the invention according to another embodiment thereof employing standard television equipment including the image orthicon; and Fig. 4 is a diagrammatic view of an additional embodiment of the invention employing the image orthicon.

Figure 1:
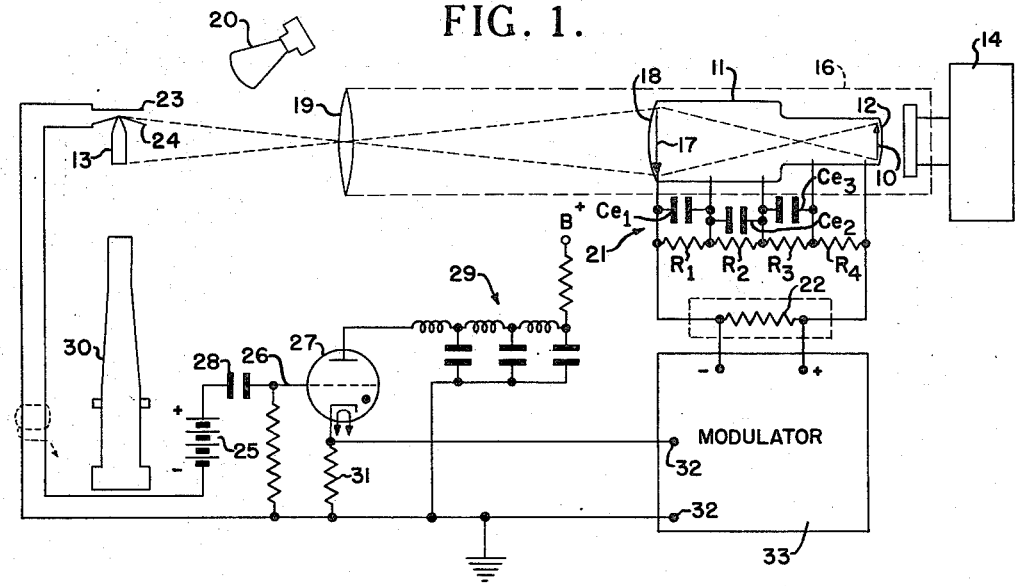
Fig. 1 is a diagrammatic view showing the electronic shutter control system according to the preferred embodiment of the present invention employing an image photo-tube and arranged to photograph a projectile in flight.

Referring now to Fig. 1 there is shown thereon an image photo-tube 11 used to provide a light image 10 on its fluorescent screen 12 of the projectile 13. Such an image can be photographically recorded by focusing camera 14 on screen 12 and enclosing the screen 12, camera 14 and lens 19 in a light tight enclosure 16.

The formation of the light image 10 can be described as follows. An optical image 17 of the projectile 13, or other object, is focused by suitable means such as lens 19 on the photo-cathode 18 of photo-tube 11 which produces an electron image. The electron image corresponds to the optical image 17 and will be transmitted and focused on the fluorescent screen 12 if the proper voltages are applied to the tube electrodes. Under these conditions the electron image impinging upon the fluorescent screen 12 will produce a visible image 10 of projectile 13.

Voltage divider means designated generally as 21 supplies the correct proportion of the modulator voltage to each electrode of tube 11, as will be more fully explained hereinafter. The modulator voltage appears across the modulator load resistor 22 and preferably is a rectangular voltage pulse of the type well known in radar applications. A rectangular voltage pulse is preferable because it utilizes the permissible exposure time with maximum efficiency, i. e., the light output of the fluorescent screen increases with voltage amplitude. With a rectangular pulse the voltage amplitude is maximum for the entire duration of the pulse. Thus, a square wave pulse is particularly essential where the exposure times are of extremely short duration. Also, if the photo-tube is not shielded from stray magnetic fields the electron image will move across the fluorescent screen if the pulse voltage is allowed to vary, i. e., depart from a rectangular shape. Such movement would result in a poor quality of output image. By making the light tight enclosure 16 of such material that it will shield the photo-tube 11 from external magnetic fields, the applied voltage pulse may depart from rectangular shapes without resulting in movement of the image on the fluorescent screen 12 during the pulse.

The rectangular voltage pulse is derived in synchronism with the event to be recorded by any convenient system such as that shown in Fig. 1, for example. In the system of Fig. 1, a continuous light source 20 is provided and a contacting device comprising contact elements 23 and 24 is located in the field of view of the optical system 19 in a manner such that electrical contact occurs between the elements 23 and 24 of the contacting device when the projectile 13 from gun 30 is also in the field of view. When this contact occurs, a positive voltage from battery 25 appears on grid 26 of thyratron 27 by means of capacitor 28. Tube 27 is thereby made conductive and discharges the artificial transmission line 29 through resistor 31, producing a rectangular voltage pulse at the input terminals 32 of modulator 33. The modulator amplifies this pulse to the proper amplitude and preserves its substantially rectangular shape across load resistor 22. Thus it is apparent that the system of Fig. 1 initiates the photo-tube 11 at the desired instant when the projectile 13 is in the field of the optical system and produces an image only for the duration of the voltage pulse.

In photographing high speed phenomena, it is essential that the effective exposure time be sufficiently short so that any motion of the object being photographed will produce negligible motion of the image produced on the film by the lens and shutter system. The system of Fig. 1 is well suited for achieving short effective exposure times since the effective exposure time will be the same as the duration of the voltage pulse supplied by modulator 33. Pulse widths as short as one microsecond and less are now commonplace with such equipment.

When short duration pulses of this type are applied to a voltage divider such as that formed by resistors $R_1$, $R_2$, $R_3$, and $R_4$, it will be found that the proportion of the voltage across each resistor will not be the same as it would be if a D. C. voltage were applied. This is because short pulses behave in a manner similar to high frequency A. C. voltages in that the capacity in shunt with the resistors $R_1$ to $R_4$ controls the voltage division when the capacitive reactances are smaller in magnitude than the respective resistances. To obtain the correct voltage division among the tube electrodes regardless of pulse width the present invention provides the proper capacitance ratio between these electrodes as well as the proper resistance ratio.

Figure 2:
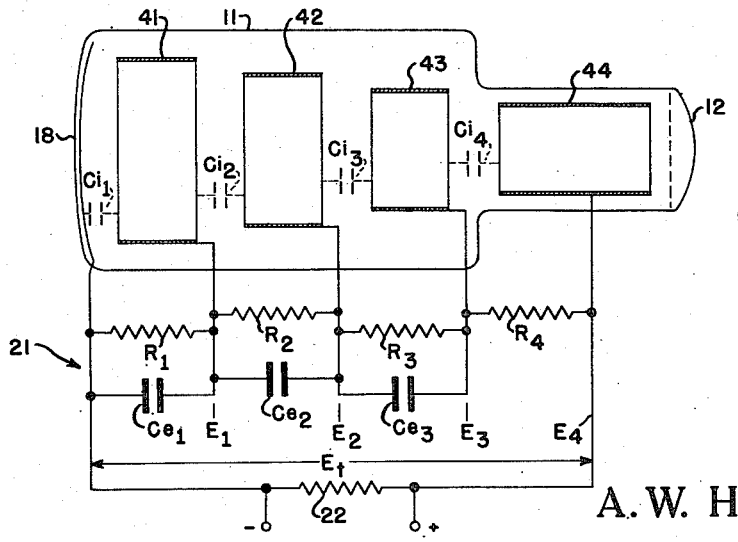
Fig. 2 is a view showing schematically the means for obtaining proper voltage distribution among the electrodes of the image photo-tube in accordance with the principle of the preferred embodiment of the invention.

Referring now to Fig. 2, the manner in which this voltage division is achieved will be more fully described. The image photo-tube 11 has a photo-cathode 18 and four concentric cylindrical electrodes 41, 42, 43 and 44. The distributed capacitances between adjacent pairs of these electrodes are represented by dashed line capacitors $C_{11}$, $C_{12}$, $C_{13}$ and $C_{14}$. The resistor values for the divider 21 are caluated by means of Ohm's law for direct current. The capacitor values for such a divider are calculated by means of Ohm's law for alternating current. For example, suppose the modulator output pulse has an amplitude of 4000 volts for pulses of all widths. Also, assume that the desired voltages at points along the divider with respect to the photo-cathode 18 are $E_1=15$, $E_2=100$, $E_3=600$ and $E_4=4000$ volts. The total value of resistance $R_t$ should be as low as practical in order to have low RC constants which are necessary to maintain a good wave shape for the modulator pulse.

Assume a total resistance, $R_t$, of one megohm and negligible current flowing into the image photo tube. Then according to Ohm's law for direct current:

$$R_t = R_1 + R_2 + R_3 + R_4 = 10^6 \text{ ohms}$$

$$E_t = 4000 \text{ volts}$$

and the same current flows through all resistors $R_1$ to $R_4$.

Therefore, $$\frac{E_t}{R_t} = \frac{E_1}{R_1} = \frac{E_2 - E_1}{R_2} = \frac{E_3 - E_2}{R_3} = \frac{E_4 - E_3}{R_4}$$

or, $$\frac{4000}{10^6} = \frac{15}{R_1} = \frac{85}{R_2} = \frac{500}{R_3} = \frac{3400}{R_4}$$

and, $$R_1 = \frac{(15)(10^6)}{4000} = 3{,}750 \text{ ohms}$$

$$R_2 = \frac{(85)(10^6)}{4000} = 21,250 \text{ ohms}$$

$$R_3 = \frac{(500)(10^6)}{4000} = 125,000 \text{ ohms}$$

$$R_4 = \frac{(3400)(10^6)}{4000} = 850,000 \text{ ohms}$$

In order to have a minimum number of condensers in the divider and also to eliminate the necessity of procuring a condenser with a 3400 volt rating the present invention eliminates an external condenser across $R_4$ and relates the other condensers to the capacitance $C_{i4}$.

To illustrate this, assume that $$C_{i1} = C_{i2} = C_{i3} = C_{i4} = 10 \mu\mu f.$$

(this is approximately true for some commercial tubes).

Neglecting the resistors, which is permissible for the equivalent of a high frequency signal, the currents through $C_1$, $C_2$, $C_3$, and $C_4$ are equal, where $C_1$ is the total capacitance across $R_1$ and equals $C_{i1} + C_{e1}$ etc. i. e., the total capacitance across $R_1$ is the sum of capacitance $C_{i1}$ and $C_{e1}$; across $R_2$ is the sum of capacitors $C_{i2}$ and $C_{e2}$ etc.

Therefore, $$\frac{E_1}{X_{C1}} = \frac{E_2 - E_1}{X_{C2}} = \frac{E_3 - E_2}{X_{C3}} = \frac{E_4 - E_3}{X_{C4}}$$

and, generally $$X_C = K\frac{1}{C}$$

then $$E_1 C_1 = (E_2 - E_1) C_2 = (E_3 - E_2) C_3 = (E_4 - E_3) C_4$$

The voltages and $C_4$ have been predetermined, therefore, $$C_1 = \frac{(E_4 - E_3)C_4}{E_1} = \frac{(3400)(10)}{15} = 2260 \ \mu\mu f.$$

$$C_2 = \frac{(E_4 - E_3)C_4}{E_2} = \frac{(3400)(10)}{85} = 400 \ \mu\mu f.$$

$$C_3 = \frac{(E_4 - E_3)C_4}{E_3} = \frac{(3400)(10)}{500} = 68 \ \mu\mu f.$$

$$C_4 = 10 \ \mu\mu f. \text{ (given)}$$

Values of the external condensers are then, $$C_{e1} = C_1 - C_{i1} = 2260 - 10 = 2250 \mu\mu f.$$
$$C_{e2} = C_2 - C_{i2} = 400 - 10 = 390 \mu\mu f.$$
$$C_{e3} = C_3 - C_{i3} = 68 - 10 = 58 \mu\mu f.$$

By choosing the values of resistors $R_1$ to $R_4$ and capacitors $C_{e1}$ to $C_{e3}$ in the manner herein set forth, proper voltage division will be obtained for all pulse widths supplied by the modulator.

Referring now to Fig. 3, a second embodiment of the present invention is shown wherein an image orthicon television pick-up tube 54 is utilized as a light shutter in a stroboscope. Obviously the same arrangement could be used as a camera shutter by focusing a camera on the kinescope screen 55 and enclosing the camera and screen 55 in a light tight enclosure. Single pulse or repetitive pulse means in place of multivibrator 56 are also obvious modifications to those skilled in the art. Rated voltages for the tube are applied to the tube electrodes such as 79, for example, except as set forth hereinafter. The voltage on electrodes 57 and 59 is the rated value only during the time of application of the operative pulse in accordance with the teaching of this invention.

A continuous light source 20 illuminates the object under observation such as the rotating propeller 60. An optical system 19 focuses the image of propeller 60 on the photo-cathode 57 forming an electron image which energizes the target 58 when the proper voltage exists on the intervening accelerator 59. Conventional scanning circuits 61 operate continuously and convert the target image, when present, into a modulated video signal which is applied to kinescope 62 or other suitable cathode-ray tube by video circuit 63 after mixing with the usual blanking signals from blanking circuit 64. The deflection or scanning circuits 61 for the kinescope 62 and the image orthicon 54 are synchronized so that the kinescope 62 reproduces on its screen 55 an image corresponding to that on the target 58. This operation is that of the conventional television system where the link between the image orthicon circuit and the kinescope circuit may be made by means of cables as shown in Fig. 3 or by a radio link as is well known in the art.

The circuit of the present invention provides means for controlling the application of operative voltage to accelerator 59 so that the energization of the target 58 corresponds to the image focused on the photo-cathode 57 only during the application of operative voltage. The effective exposure time, therefore, is equal to the time duration of the operative voltage pulse. When accelerator 59 does not have operative voltage applied thereto, no image signal reaches the target 58. By synchronizing the repetition frequency of the pulses from multivibrator 56 integrally with the speed of revolution of propeller 60 a stationary image will be obtained on the screen 55. Here again, to be satisfactory, the pulse duration must be sufficiently short to prevent any motion of the propeller during the pulse from producing any apparent motion in the image produced on screen 55. This criterion is related to the overall resolution of the system. It may further be desired to maintain the pulse repetition frequency of multivibrator 56 lower than the rate of scanning the target 58 to prevent the incidence upon target 58 of more than one electron image each time the target is scanned.

Operative voltage pulses may be supplied by any convenient means such as the multivibrator 56 with its output voltage, of polarity as shown, applied to a suitable voltage divider 65 comprising resistors $R_5$, $R_6$ and $R_7$. The voltage divider is so arranged that the relative magnitudes of the voltages applied to the electrodes 57, 58 and 59 are the rated operating voltages for the particular tube 54 during the time of application of the operative pulse. The design of such a voltage divider including added capacitors $C_{e4}$, $C_{e5}$ and $C_{e6}$ to obtain the proper capacitance ratio can be carried out in a manner similar to that set forth in detail in relation to Fig. 2. The duration of the pulse can be as short as desired because the image produced thereby on the target 58 will persist for a sufficiently long period for a complete scan of the target to occur. The image, therefore, will have characteristics of an extremely rapid exposure corresponding to the short pulse applied and can be converted into the video signal by completing the scan of the persistent image between pulses.

Referring now to Fig. 4 there is shown a further embodiment of the invention as a modification of the system of Fig. 3 which may be used to advantage in some situations. In this circuit the grid controlled discharge tube 67 is utilized to cut off the electron beam in tube 54 except during pulses from multivibrator 56. Obviously, in this case, the only voltage pulses that can be used are those having a duration not less than the time required for one complete scan of the target 58. This is so because at the end of the voltage pulse from multivibrator 56 the electron beam scanning target 58 is cut off until the start of the next pulse, thus making video signals available only during the applied pulse period.

The circuit of Fig. 4 accomplishes beam blanking by applying a portion of the applied pulse from potentiometer 70 through coupling capacitor 68 to the grid 69 of tube 67. Tube 67 is biased by bias means 71 and potentiometer 72 to be normally conductive, thereby maintaining its plate 73 negative with respect to ground by an amount sufficient to blank the scanning beam of tube 54. This control is obtained by connecting grid 74 of the image orthicon 54 to plate 73 of tube 67 by means of lead 75. Plate 73 is normally negative because the B supply 76 has its positive terminal grounded at 77 and the current in tube 67 produces a voltage drop in resistor 78. During the negative voltage pulse from multivibrator 56, tube 67 becomes less conductive thereby reducing the voltage drop in resistor 78. The potential of plate 73 and hence grid 74 of tube 54 is thereby raised to a value which permits normal beam current in tube 54.

The modification shown in Fig. 4 can be used whenever the desired exposure time is equal to or greater than the time required for a complete target scan with the deflection circuits employed. By blanking the beam in the manner set forth a lower noise level results in the video circuit which in turn affords a more distinct image at the receiving cathode-ray tube 62.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed as new and desired to be secured by Letters Patent of the United States is:

1. In a system for observing high speed phenomenon, a light sensitive electrode for producing an electron image corresponding to the instantaneous view of said phenomenon, means for producing a voltage pulse of short duration, an electron responsive target for producing a detectable image corresponding to said electron image when the latter is projected on said target, accelerator electrodes for electron optically focusing said electron image on said target, and voltage divider means including parallel capacitive and resistive branches connected between adjacent electrodes for applying said pulse to said accelerator electrodes, means for applying said pulse across said voltage divider means, said resistive branches producing a predetermined direct-current voltage distribution between adjacent electrodes, said capacitive branches having values such that the total capacitance between adjacent electrodes produces an alternating-current voltage distribution therebetween corresponding to said predetermined direct-current voltage distribution.

2. In a system for observing high speed phenomena, means for producing a single non-recurring voltage pulse of short duration, an image phototube including a light sensitive electrode for producing an electrode image at said light sensitive electrode corresponding to the instaneous view of an optical image projected thereon, a screen in said tube having a persistence longer than the duration of said pulse and a plurality of accelerated electrodes in said tube between said light sensitive electrode and said screen, potential divider means connected to said pulse producing means and to each of said electrodes for applying said pulse to said electrodes to thereby accelerate said electron image and project the electron image on said screen, said screen producing a visible image of relatively longer duration than said pulse upon application of said electron image thereto, and said potential divider means comprising a plurality of parallel capacitive and resistive branches connected between adjacent electrodes, said resistive branches producing a predetermined direct-current voltage distribution between adjacent electrodes, said capacitive branches having values such that the total capacitance between adjacent electrodes produces an alternating-current voltage distribution therebetween corresponding to said predetermined direct-current voltage distribution.

3. In an apparatus for observing high speed phenomena including a tube, a light sensitive electrode in said tube for producing an electron image corresponding to the instantaneous view of an optical image projected thereon, means for producing a voltage pulse of short duration, an electron responsive target in said tube for producing a detectable image corresponding to said electron image when the latter is projected on said target, accelerator electrodes in said tube between said light sensitive electrode and said target, voltage divider means electrically connected to said pulse producing means and including parallel resistive and capacitive branches connected between the adjacent electrodes for applying said pulse to said accelerator electrodes to thereby electron-optically focus said electron image on said target, said resistive branches producing a predetermined direct-current voltage distribution between adjacent electrodes, said capacitive branches having values such that the product of the total capacitance between each of the adjacent electrodes and the direct-current voltage therebetween equals the product of the interelectrode capacitance between the pair of accelerator electrodes nearest said target and the direct-current voltage between said last named electrodes.

References Cited in the file of this patent

UNITED STATES PATENTS

| Number | Name | Date |
|---|---|---|
| 2,189,319 | Morton | Feb. 6, 1940 |
| 2,198,479 | Langmuir | Apr. 23, 1940 |
| 2,234,806 | Ploke | Mar. 11, 1941 |
| 2,251,786 | Epstein | Aug. 5, 1941 |
| 2,256,523 | Lubszynski | Sept. 23, 1941 |
| 2,287,298 | Dillenburger | June 23, 1942 |
| 2,373,114 | Goldsmith | Apr. 10, 1945 |
| 2,382,981 | Edgerton | Aug. 31, 1945 |
| 2,402,053 | Kell | June 11, 1946 |
| 2,421,182 | Bayne | May 27, 1947 |
| 2,505,060 | Oliver | Apr. 25, 1950 |